March 22, 1927.
J. P. HEENEY ET AL
1,621,724
BUBBLER HEAD FOR FOUNTAINS
Filed March 4, 1926
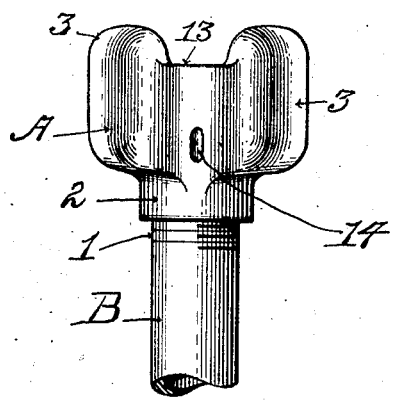
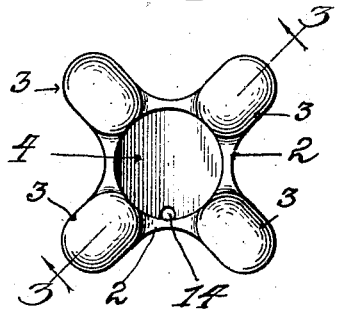
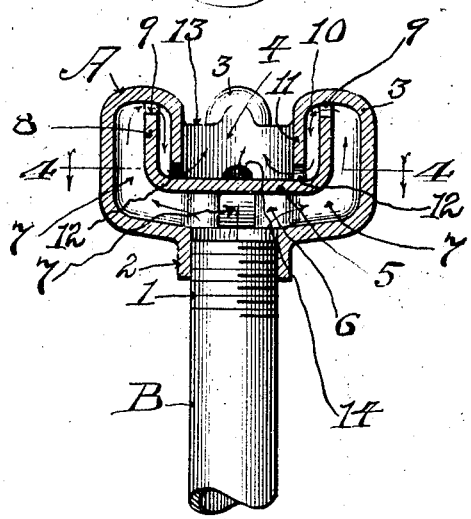
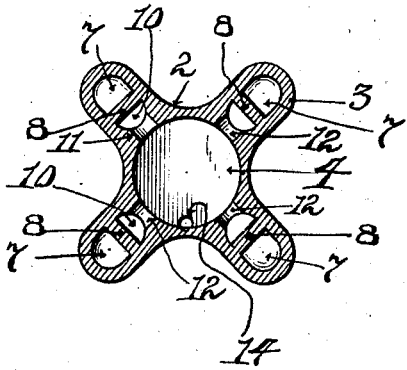
Inventors:
Joseph P. Heeney and
John G. Mitchell,
by Brown & MacGregor Attys.

Patented Mar. 22, 1927.

1,621,724

UNITED STATES PATENT OFFICE.

JOSEPH P. HEENEY AND JOHN G. MITCHELL, OF CHICAGO, ILLINOIS.

BUBBLER HEAD FOR FOUNTAINS.

Application filed March 4, 1926. Serial No. 92,131.

This invention relates to improvements in bubbler heads for fountains and the like.

One of the objects of the invention is to provide a bubbler head which will cause the inflowing supply of water to be diverted into a plurality of channels which lead into a common and central receiving chamber, in which the reunited streams of water will bubble upwardly above the top of the head a proper height for the purpose intended, without the unpleasant force usually given to water in bubbler heads due to the pressure in the supply pipe.

Another object of the invention is to prevent water in the bubbler chamber from draining back into the supply pipe, when the supply of water is shut off.

Another object is to produce a bubbler head of pleasing design, made in one piece, and having no complicated parts to get out of order.

To the attainment of the foregoing objects, our invention consists in the devices illustrated and herein described and more particularly pointed out in the claims appended hereto.

In the drawings:

Figure 1 is a side elevation of a bubbler head constructed in accordance with our invention, positioned upon the upper end of a supply pipe.

Figure 2 is a top plan view of the same.

Figure 3 is a sectional view of the bubbler head, the section being taken in the vertical plane indicated by the dotted line 3—3 of Figure 2.

Figure 4 is a transverse, sectional view of the bubbler head, the section being taken in the horizontal plane indicated by the dotted line 4—4 of Figure 3.

The bubbler head is indicated as a whole by the letter A and is shown as being secured to the upper end of an ordinary supply pipe B, preferably by means of screw threads 1. The head A comprises a tubular, central or body portion 2, provided with a plurality of radially extending members 3, so that upon looking in plan view, the device as a whole assumes the cruciform outline indicated in Figure 2. The central portion 2 is provided with a top opening bubbler chamber 4, the bottom of which is formed by the horizontally disposed wall or partition 5. Upon the lower side of the partition 5 is a receiving chamber 6, into which water coming from the supply pipe B freely enters, with such force as to strike the bottom of the partition wall 5 and find its outlet in a plurality of passageways or conduits 7, one in each of the members 3.

Integral with and extending from the partition 5 are a plurality of upwardly arranged walls 8, one in each of the members 3, and through the upper portion of the walls 8 is a lateral passageway or conduit 9, which affords communication between the conduit 7 and a smaller conduit 10, said conduit 10 extending between the wall 8 and the inside of the wall 11 of the tubular or body portion 2.

In the lower end of the wall 11 is a passageway or conduit 12, which establishes communication between the conduit 10 and the bubbler chamber 4.

The operation of the device will readily be understood. Water being turned on into the supply pipe B, enters the receiving chamber 6 of the head and flows in four directions; that is, into each of the four conduits 7, upwardly through the connecting passageway 9 and then downwardly into the passageway 10, and finally laterally, through the passageway 12.

The supply of water thus being divided into four streams, enters the bubbler chamber 4 in four different streams which meet in the center thereof, with the result that the water bubbles upwardly above the top margin 13 of the bubbler chamber and sufficiently high to enable a person using the device, as in the act of drinking, to gather the water in the mouth; the water bubbling in an easy, gentle flow, and without the unpleasantness which would ordinarily result if the full force of the water pressure was directed in a single stream.

When the water is shut off by closing the pipe B, (the valve for this purpose not being any part of our invention, is not herein illustrated), the water that is in the conduit 10 will seek its proper level in the bubbler chamber 4 and will be drained off therefrom together with any surplus water in said chamber, through a drain pipe 14 through the wall of the body portion 2.

The water in passageway 7 will naturally settle below the level of the passageway 9 in partition wall 8, but no water that has passed through passageway 9 will return to the source of supply, even though the drain 14 may become temporarily choked. The bottom of passageway 9 is higher than the top 13 of the bubbler chamber 4 and hence water in the latter, in the event of choking of drain 14, would overflow the top margin of the chamber 4.

We claim as our invention:

1. A bubbler head comprising in a unitary structure an interior receiving chamber, an open end bubbler chamber, a plurality of conduits leading from the receiving chamber and discharging into and near the bottom of the bubbler chamber and below the level of the highest part of the conduit, each conduit having a tortuous path.

2. A bubbler head comprising in a unitary structure, an interior receiving chamber, an open end bubbler chamber, a plurality of conduits each leading from the receiving chamber over a vertically disposed partition and discharging into the bubbler chamber below the top of the latter and below the level of the highest part of the conduit.

3. A bubbler head comprising an interior receiving chamber, an open end bubbler chamber, a plurality of conduits each leading from the receiving chamber over a vertically disposed partition and discharging into the bubbler chamber below its top, the height of the interior partitions being greater than the height of the walls of the bubbler chamber.

4. A bubbler head comprising a unitary casting having a cylindric body portion adapted at one end for operative connection with a liquid supply pipe, an interior liquid receiving chamber, an open recess constituting a bubbler chamber, a plurality of radially, longitudinally disposed members, each having an apertured partition, a liquid passageway on each side of the partition and communicating with each other through the partition aperture, one of said passageways communicating with the receiving chamber and the other with the bubbler chamber, and a drain opening leading from the bubbler chamber.

5. A bubbler head comprising a unitary casting having a cylindric body portion adapted at one end for operative connection with a liquid supply pipe, an interior liquid receiving chamber, an open recess constituting a bubbler chamber, a plurality of radially, longitudinally disposed members, each having an apertured partition, a liquid passage way on each side of the partition and communicating with each other through the partition aperture, one of said passageways communicating with the receiving chamber and the other with the bubbler chamber, and a drain opening leading from the bubbler chamber, the lower level of the partition aperture being at or above the top wall of the bubbler chamber.

In testimony that we claim the foregoing as our invention we affix our signatures, this 1st day of March, 1926.

JOSEPH P. HEENEY.
JOHN G. MITCHELL.